(12) United States Patent
Peterson (10) Patent No.: US 10,717,375 B1
(45) Date of Patent: Jul. 21, 2020

(54) APPENDAGE SUPPORT FOR CHILD SEAT

(71) Applicant: Steven B. Peterson, South Jordan, UT (US)

(72) Inventor: Steven B. Peterson, South Jordan, UT (US)

( * ) Notice: Subject to any disclaimer, the term of this patent is extended or adjusted under 35 U.S.C. 154(b) by 0 days.

(21) Appl. No.: 16/275,183

(22) Filed: Feb. 13, 2019

Related U.S. Application Data (62) Division of application No. 15/702,653, filed on Sep. 12, 2017, now Pat. No. 10,464,450.

(60) Provisional application No. 62/393,333, filed on Sep. 12, 2016.

(51) Int. Cl.
| | |
|---|---|
| *A47D 15/00* | (2006.01) |
| *A47C 7/50* | (2006.01) |
| *B60N 2/28* | (2006.01) |
| *B60N 3/06* | (2006.01) |
| *B64D 11/06* | (2006.01) |
| *B60N 2/90* | (2018.01) |

(52) U.S. Cl.
CPC .............. *B60N 2/286* (2013.01); *A47C 7/506* (2013.01); *A47D 15/00* (2013.01); *B60N 2/995* (2018.02); *B60N 3/063* (2013.01); *B64D 11/0643* (2014.12); *A47C 7/50* (2013.01)

(58) Field of Classification Search
CPC .......... A47D 15/00; B60N 3/06; B60N 3/063; B60N 2/995; B60N 2/26; B64D 11/0643; A47C 7/506; A47C 7/5062; A47C 7/5064; A47C 7/52; A47C 7/50
See application file for complete search history.

(56) References Cited

U.S. PATENT DOCUMENTS

| | | | | |
|---|---|---|---|---|
| 5,111,909 A | * | 5/1992 | Liu | B60R 3/007 |
| | | | | 182/150 |
| 5,556,167 A | * | 9/1996 | Johnson Siemion | A47C 16/02 |
| | | | | 297/423.15 |
| 5,560,679 A | * | 10/1996 | Barnholdt | A47D 1/103 |
| | | | | 297/250.1 |
| 6,860,557 B2 | * | 3/2005 | Jonasson | B60N 2/26 |
| | | | | 297/253 |
| 7,753,445 B2 | | 7/2010 | Kassai et al. | |
| 8,757,723 B1 | * | 6/2014 | Faust | A47C 31/11 |
| | | | | 297/423.39 |
| 2007/0170674 A1 | * | 7/2007 | Chuah | A47D 5/006 |
| | | | | 280/47.38 |
| 2017/0043682 A1 | * | 2/2017 | Yang | B60N 2/28 |

FOREIGN PATENT DOCUMENTS

| | | | | | |
|---|---|---|---|---|---|
| CN | 101797901 | * | 8/2010 | | |
| EP | 1147939 A2 | * | 10/2001 | ............. | B60N 3/063 |
| EP | 1180448 A1 | * | 2/2002 | ........... | B60N 2/2824 |
| GB | 463171 A | * | 3/1937 | ............. | A47C 7/506 |
| JP | 10323258 A | * | 12/1998 | ............. | B60N 2/995 |
| WO | WO-0242114 A1 | * | 5/2002 | ............. | B60N 3/063 |
| WO | WO-2012050497 A1 | * | 4/2012 | ........... | B60N 2/2866 |

* cited by examiner

*Primary Examiner* — Ryan D Kwiecinski
(74) *Attorney, Agent, or Firm* — Jason P. Webb; Pearson Butler (57) ABSTRACT

An apparatus for supporting an appendage of a seated user, generally in a vehicle, including adjustable support arms attached a seat with a platform disposed at a distal end of second support arms so that the appendage of the user, such as a child, are supported thereon for comfort of the user.

21 Claims, 10 Drawing Sheets

APPENDAGE SUPPORT FOR CHILD SEAT

CROSS-REFERENCE TO RELATED APPLICATIONS

This application claims the benefit of U.S. Provisional Patent Application No. 62/393,333 filed Sep. 12, 2016, and U.S. patent application Ser. No. 17/702,653 filed Sep. 12, 2017.

STATEMENT REGARDING FEDERALLY SPONSORED RESEARCH OR DEVELOPMENT

Not Applicable.

BACKGROUND

1. The Field of the Present Disclosure

The present disclosure relates generally to child seats used to keep a human child restrained and safe, generally in motor vehicles, but also in the home (as in a high chair) and this disclosure relates more particularly to foot rests for those child seats.

2. Description of Related Art

Various devices have been devised for providing safe, comfortable, and healthy seating for users, including children in motor vehicles. For example, child car seats have been developed for safely transporting children in vehicles, with various features and developments directed to both the health and the comfort of the child. Other types of seats, including booster seats and high chairs, have also been developed with an eye toward child health and safety.

It has also been discovered that children may suffer from discomfort or pain when seated, which may be caused from the hanging or dangling position of the user's legs and feet while restrained in one of these seats. In particular, a child properly restrained in a car seat in a moving vehicle may experience such pain and discomfort from the unsupported position of the child's legs and feet. This unsupported position may have adverse health effects caused by improper blood flow. This unsupported position may also lead a child to be restless, and the child may squirm in his/her seat, including movement of his/her legs and feet. It may also lead to the child kicking his/her feet against the surface, such as a vehicular seat positioned in front of the child, or otherwise causing disturbances. A number of solutions have been used, such as placing a box under the child's feet, and footrests attachable to the various types of booster seats have been developed.

However, no child car seat with an integrated retractable footrest has been used, and some footrests are installed between the child seat and the seat of the car itself, which could lead to the seat being installed improperly. In addition, these footrests are not retractable and are not easily movable, getting in the child's path as the child, or another user, attempts to enter or exit the vehicle. As can be seen, despite prior devices, improvements are still being sought for novel and unique devices for providing seats and footrests for users, including children. As used herein, the term "vehicle" shall include any device which is used to transport human beings, whether such device is motor or human powered.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

As used herein, the term "child seat" refers to a seat designed to safely restrain a child in any of a variety of settings, such as a high chair, a child car seat or a booster seat.

Applicant has invented a novel appendage support for seats, such as child seats. Applicant has discovered that users, and for example children, may suffer from discomfort or pain when seated, which may be caused from the hanging or dangling position of the user's legs and feet. In particular, a child properly restrained in a car seat in a moving vehicle may experience such pain and discomfort from the unsupported position of the child's legs and feet. This unsupported position may have adverse health effects caused by improper blood flow. This unsupported position may also lead a child to be restless, and the child may squirm in his/her seat, including movement of his/her legs and feet. It may also lead to the child kicking his/her feet against the surface, such as a vehicular seat positioned in front of the child, or otherwise causing disturbances.

Accordingly, the exemplary embodiments of the present invention provide a novel apparatus for supporting one or more legs of a user. As described in more detail below, the apparatus may be built into, or be an integral component of, a seat, such as a child vehicle seat, booster seat, or high chair. The apparatus may alternatively be an add-on device that may be used to retrofit existing seats.

Figure 1:
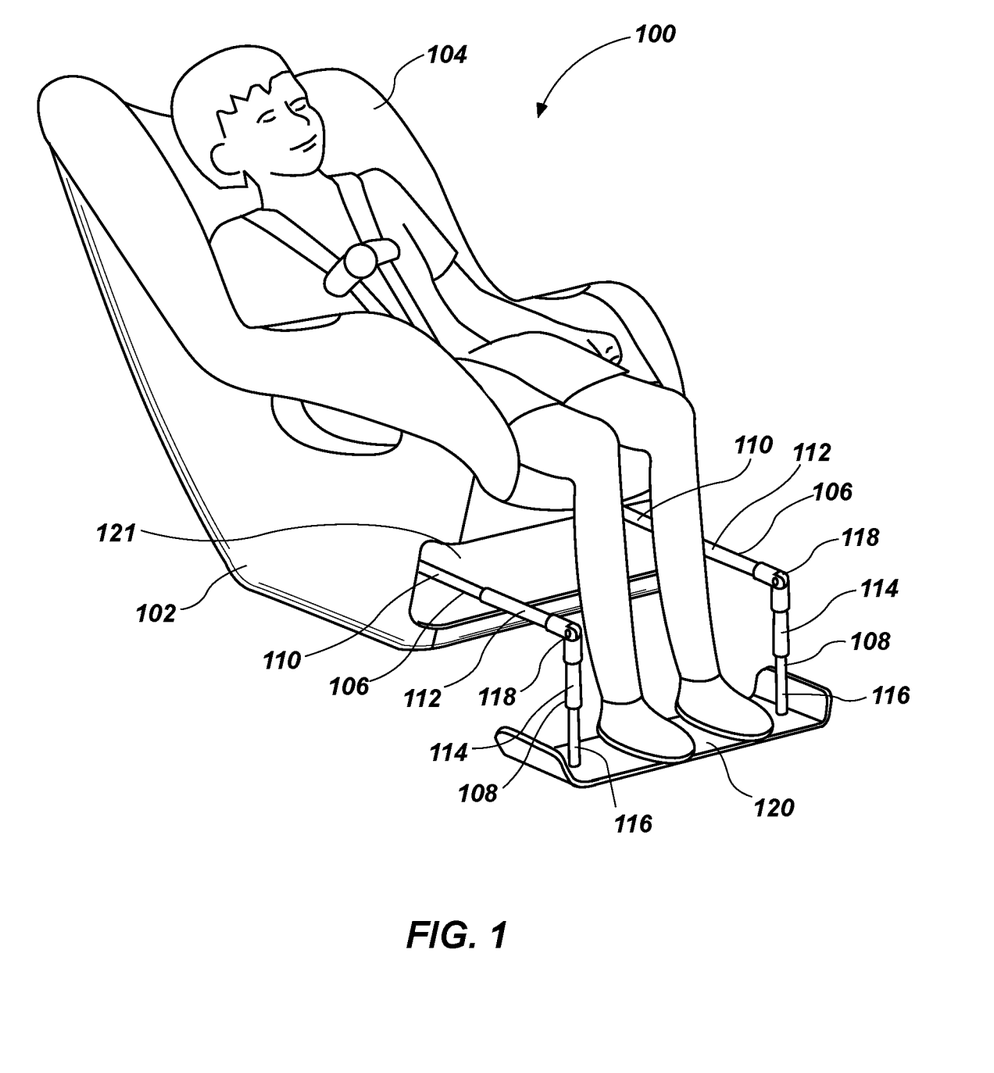
FIG. 1 is a perspective view of an appendage support according to an embodiment of the present invention.
Figure 2:
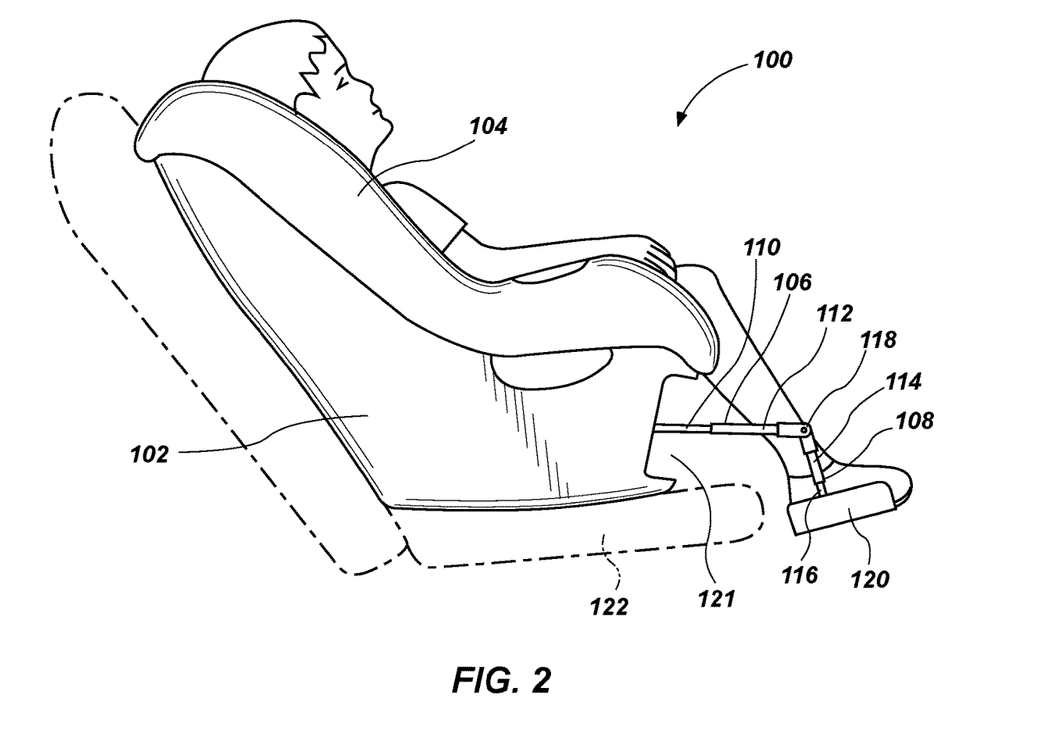
FIG. 2 is a side view of the embodiment of FIG. 1.

Referring now to FIGS. 1 and 2, a foot rest apparatus 100 for supporting the legs of a seated user is depicted according to an embodiment of the present invention. The foot rest apparatus 100 includes a base 102, which may form a portion of a child car seat 104. Alternatively, base 102 may form a portion of a variety of seats, including child seats, such as vehicular seats, booster seats and high chairs. Foot rest apparatus 100 may also include a pair of first support arms 106 attached to the base 102 and extending outwardly from the base 102. A pair of second support arms 108 may extend from a distal end of the pair of first support arms 106, with a hinge 118 disposed between each of the first and second support arms 106, 108. A platform 120 may be disposed at a distal end of the second support arms 108.

Each of the first support arms 106 may include at least one outer arm member 112 and at least one inner arm member 110, the inner arm member 110 configured and dimensioned to be disposed within the outer arm member 112 when the platform is in a stored position, as described in greater detail below. The inner and outer arm members 110, 112 may be cylindrical, such as being formed of cylindrical tubing of metal or plastic. Alternatively, inner and outer arm members 110, 112 may be square, rectangular, or of any other configuration that allows for inner arm member 110 to be disposed within outer arm member 112.

Each of the second support arms 108 may include a lock arm 114 and an extending arm 116. As described with reference to inner and outer arm members 110, 112 of first support arm 106, lock arm 114 and extending arm 116 may be cylindrical, or any other suitable shape or dimension, and may be of metal or plastic.

Foot rest apparatus 100 may provide for a storable leg support. For example, platform 120 may be retractable in-and-out of recess 121, with platform 120 forming part of base 102 when retracted, as further explained below. When extended, platform 120 may hang past a seat bottom 122 on which base 102 rests, thereby allowing the legs and feet of a user to comfortably extend downward, past the seat bottom 122.

Figure 3:
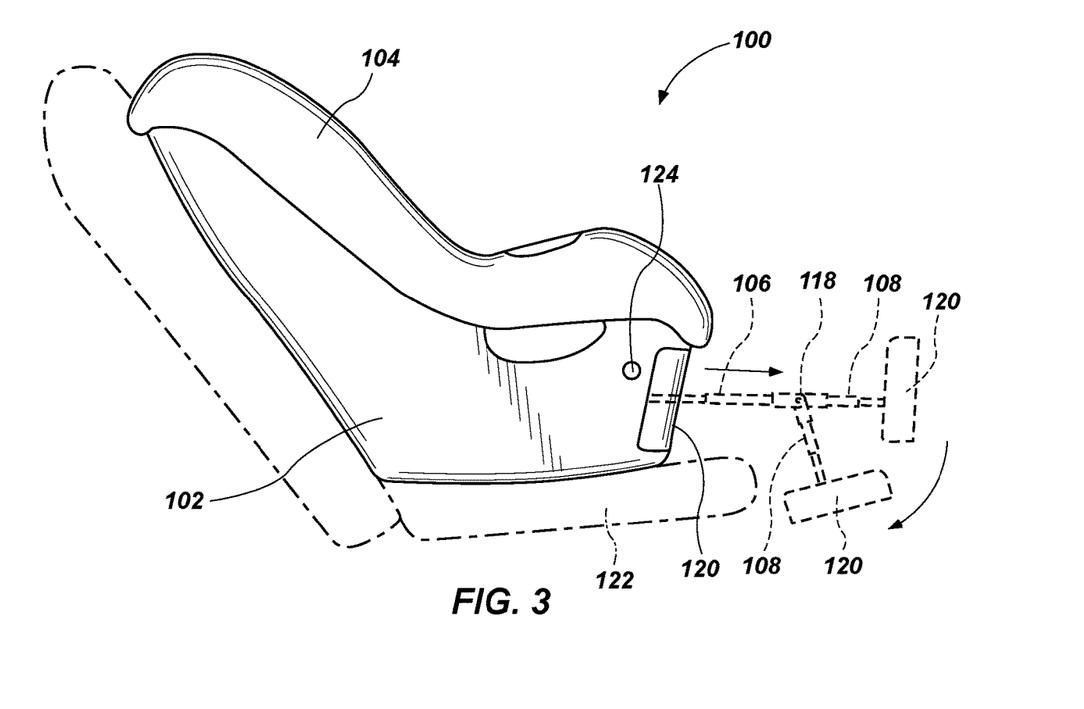
FIG. 3 is a side view depicting the articulation of the embodiment of FIG. 1.

As shown in FIG. 3, platform 120 may be retractable from a stored position to an extended position. Platform 120 may be even or flush with base 102 in a stored position, with platform 120 completing closing recess 121 (See FIG. 2). In an intermediate position, platform 120 may be pulled outward from base 102, with first support arm 106 extended. In an extended position, platform 120 may hang downward, with hinge 118 allowing second support arm 108 to swing relative to first support arm 106.

The base 102 may comprise a closure mechanism 124 to retain the platform 120 in the stored position. For example, closure mechanism 124 may be a button on the side of base 102, which may be pressed to release platform 120 from its stored position. The button may cooperate with a lock structure on the platform 120 such that when platform 120 is placed in the stored position in recess 121, it snaps or locks into place until the button is pushed. Closure mechanism 124 may alternatively be any mechanism for attaching platform 120 to the base 102, such as a strap with snaps, a strap with hook and loop fasteners, a buckle, or any other suitable mechanism.

Figure 4A:
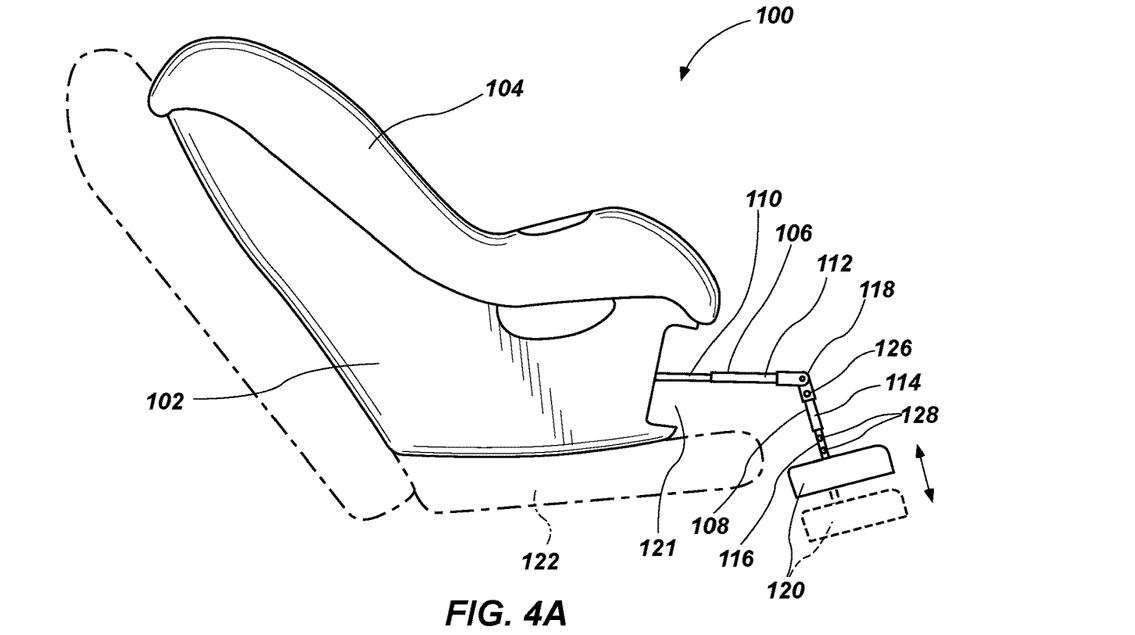
FIGS. 4A and 4B are detailed views depicting the adjustment of the embodiment of FIG. 1.
Figure 4B:
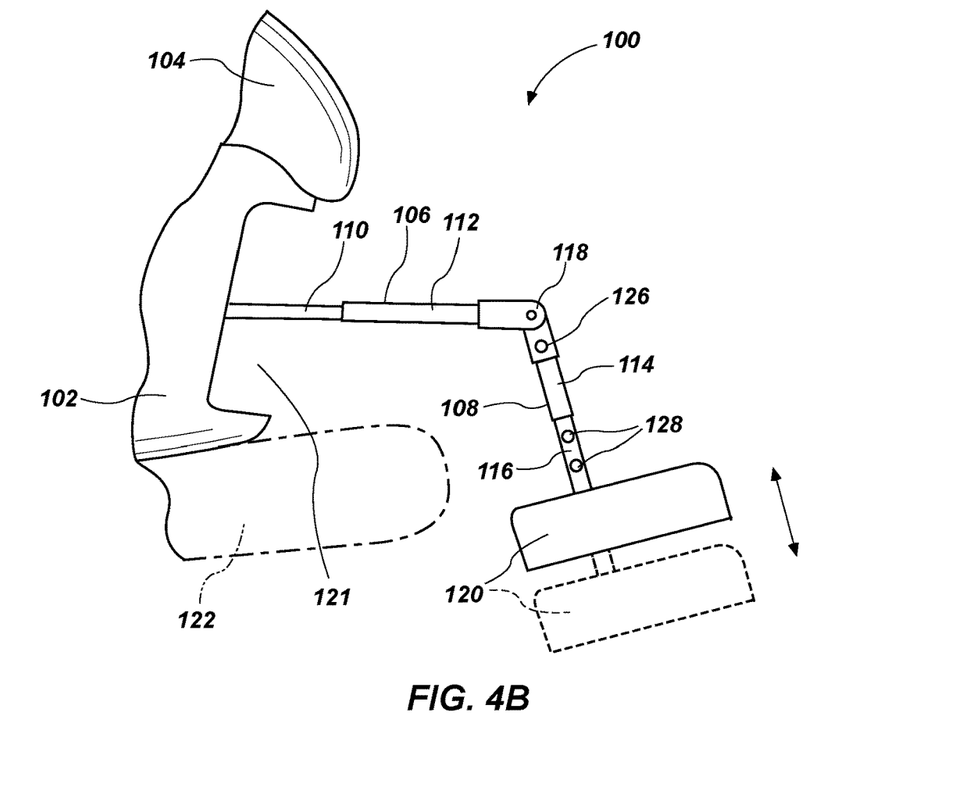

With reference now to FIGS. 4A and 4B, each of the second support arms 108 may have an adjustable length, or may be configured to provide for the adjustment of the height of the platform 120 when in the extended position. For example, the lock arm 114 may include a lock button 126, and the extending arm 116 may include a plurality of lock stops 128. The lock button 126 and plurality of lock stops 128 may provide for the extension and adjustment of second support arms 108 in a manner as known to one of ordinary skill in the art. For example, lock button 126 may cooperate with one of the plurality of lock stops 128 to secure extending arm 116 at a specific length relative to lock arm 114. Alternatively, second support arms 108 may employ other length or height adjustment structures known in the art, such as spring and ball detent structures or removable pin in through-holes.

It will be appreciated that ease of adjustment will be an advantage of the present invention. As users, and specifically children, may be of varying heights, with corresponding varying length lengths, platform 120 may need to be adjusted up or down so that the user's feet rest comfortably on the platform 120.

As depicted in FIGS. 1-4, the present invention may further be described as a child seat with integral foot rest, the child seat having at least one retractable support arm, such as first or second support arms 106, 108. The child seat may include a foot rest disposed on a distal end of the one or more retractable support arms. The foot rest and the retractable support arm(s) may be configured and dimensioned to reside within the child seat in a stowed position, and to support the legs of a user in an extended position. It is within the scope of the exemplary embodiments to include a structure to restrain the user's feet and/or legs into position.

Figure 5:
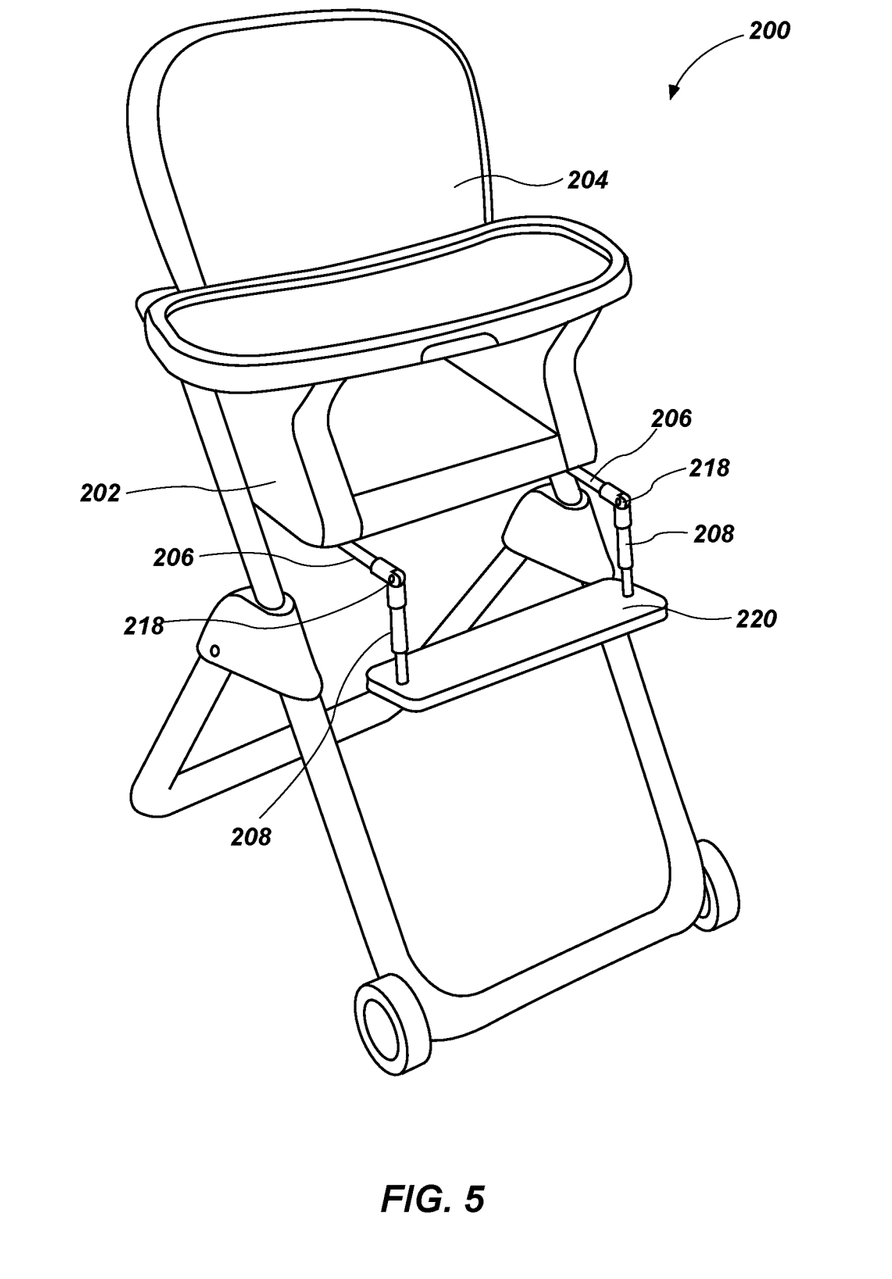
FIG. 5 is a perspective view of an appendage support according to another embodiment of the present invention.
Figure 6:
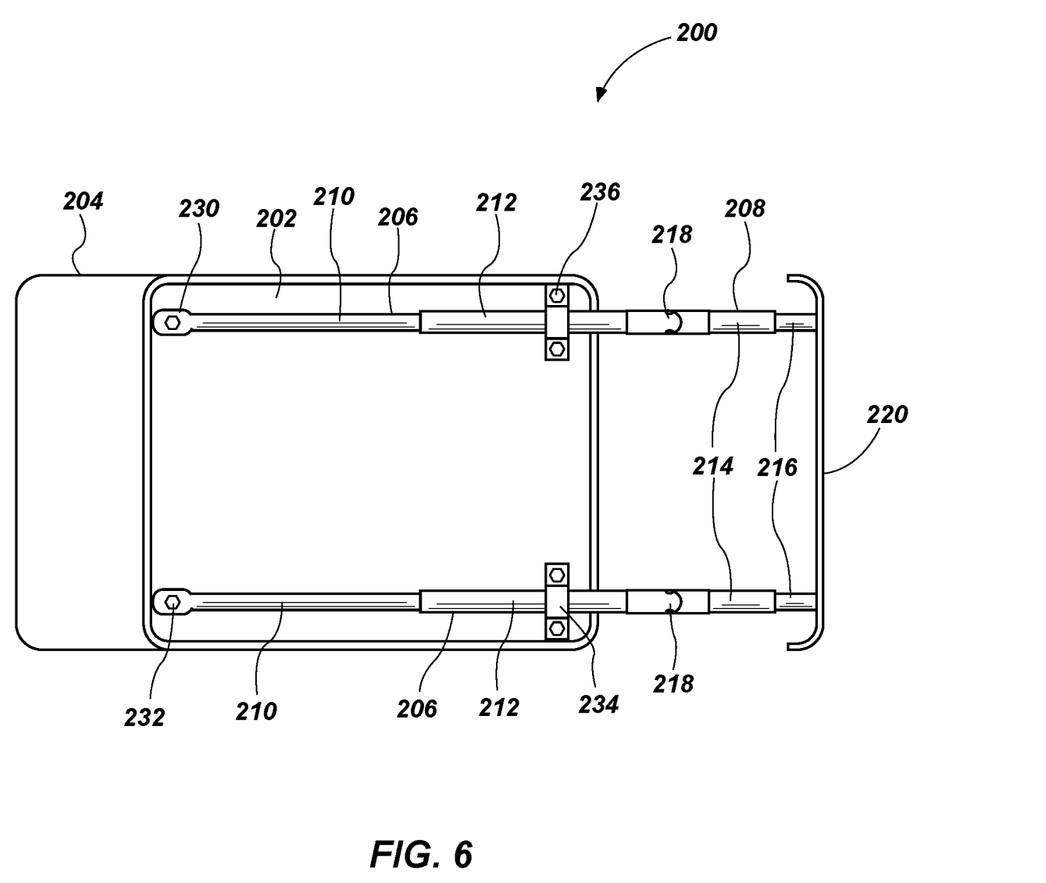
FIG. 6 is a bottom view of the embodiment of FIG. 5.

As shown in FIGS. 5-6, the present invention includes another embodiment of a foot rest apparatus 200, where like reference numerals correspond to like features of other embodiments disclosed herein. Foot rest apparatus 200 includes a base 202, which may form a portion of a child high chair 204. A pair of first support arms 206 and a pair of second support arms 208 may be joined by a hinge 218, and may be configured and dimensioned to retractably support a platform 220. Similar to that which is described above, each of the first support arms 206 includes an inner arm member 210 and an outer arm member 212, and each of the second support arms 208 includes a lock arm 214 and extending arm 216.

Support arms 206, 208 may be attached to base 202 in a variety of ways. In one example, which may be utilized to attach support arms 106, 108 to base 102 in the above embodiment of the invention, the support arms 206, 208 are bolted to the base in a way that supports the weight that may be placed on the platform 220, while still allowing for the extension of first and second arms 206, 208. For example, first arm 206 may include an attachment portion 230. Attachment portion 230 may be a flattened portion of the inner arm member 210, and may include a through-hole. An attachment fastener 232 may be used to secure attachment portion 230 to base 202.

Furthermore, a hanging support member 234 may be disposed around first support arm 206. In other words, first support arm 206 may be disposed within hanging support member 234, or between hanging support member 234 and base 202. Hanging support member 234 may provide the cantilevered support necessary for support arms 206, 208 and platform 220 to bear the weight of a user's legs and feet in the extended position. Hanging support member 234 may be any bracket suitable for supporting first support arm 206 relative to base 202. For example, hanging support member 234 may be a U-shaped bracket, with hanging support fasteners connecting either side of the U-shape to the base 202. Alternatively, any support member or system may be employed, as known in the art, to bear the weight of the platform 220 and support arms 206, 208 in the extended position.

Figure 7:
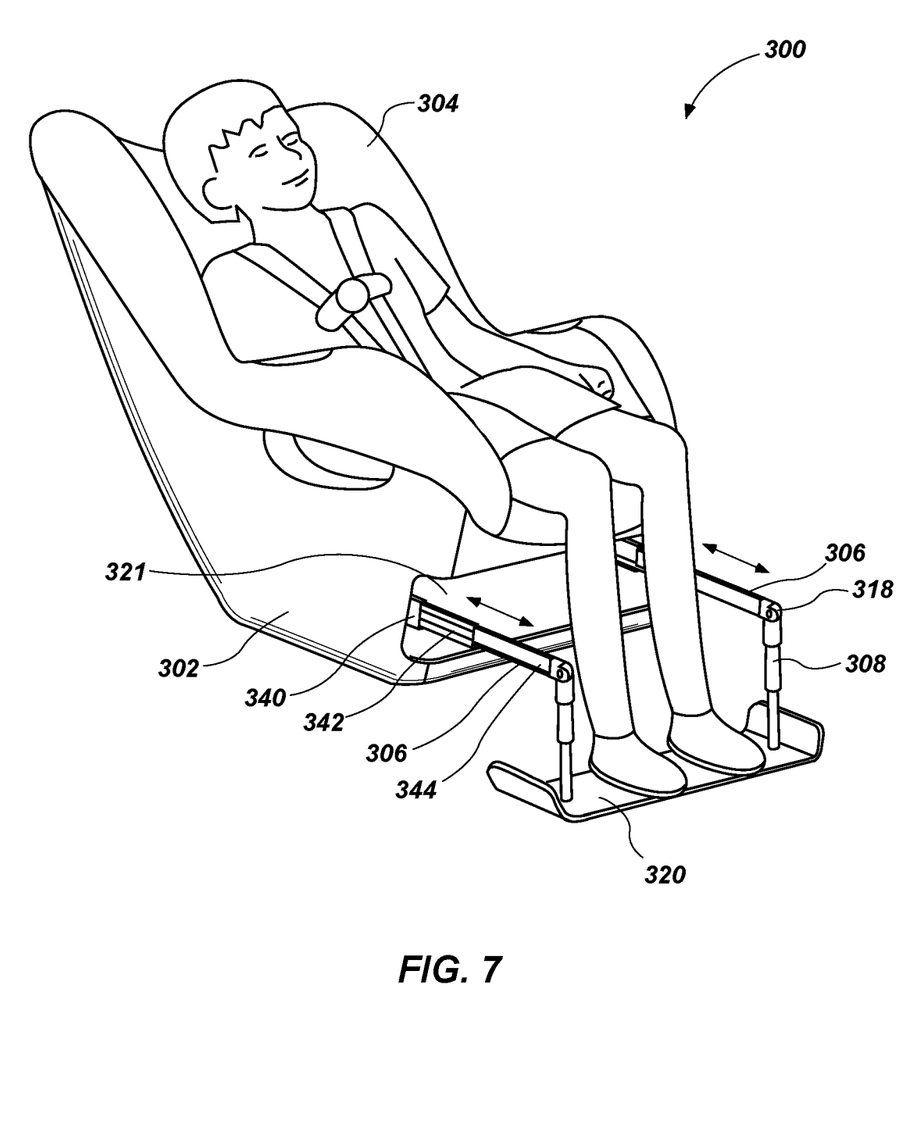
FIG. 7 is a perspective view of an appendage support according to another embodiment of the present invention.
Figure 8:
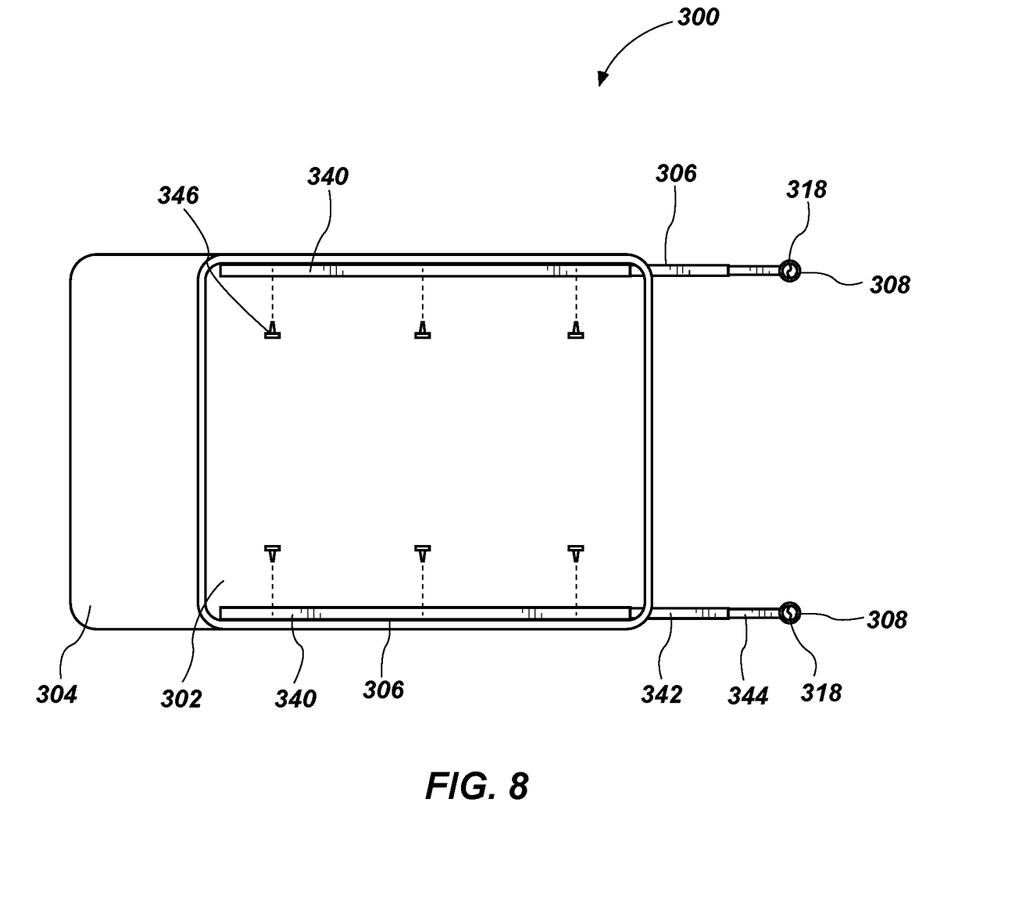
FIG. 8 is a bottom view of the embodiment of FIG. 7.

As shown in FIGS. 7-8, another embodiment of a foot rest apparatus 300 may include a base 302, which may form part of a child car seat 304, and may include a set of first slide arms 304. Slide arms 304 may include a mounting bracket 340, a first slide bracket 342, and a second slide bracket 344. As disclosed above, foot rest apparatus 300 may further include a second support arm 308, which may be adjustable as described above, and a platform 320. First slide bracket may be attached to base 302 by one or more slide bracket fasteners 346. Slide arms 304 may be ball bearing slides, roller slides, or any other slide mechanism, similar to drawer slides known in the art.

Figure 9:
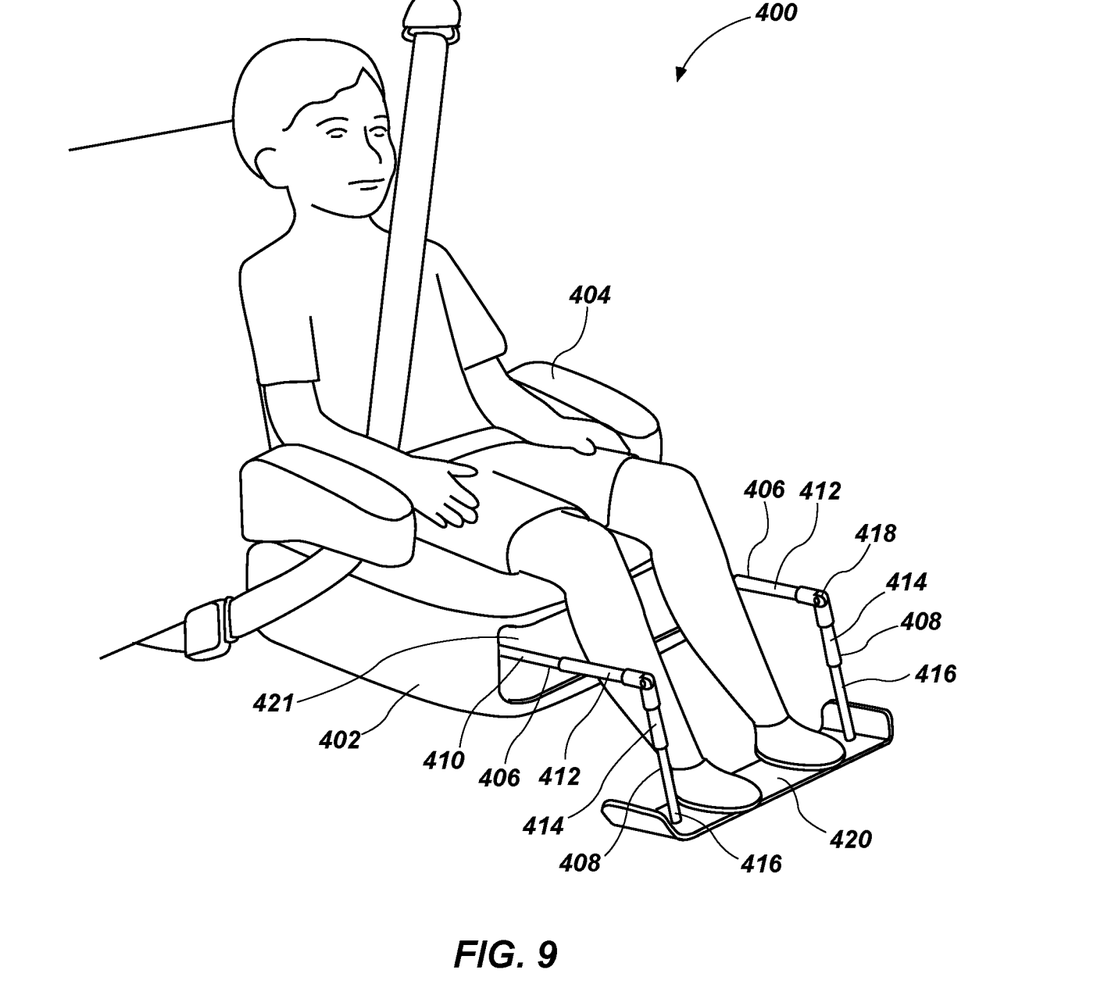
FIG. 9 is a perspective view of yet another embodiment of the present invention.
Figure 10:
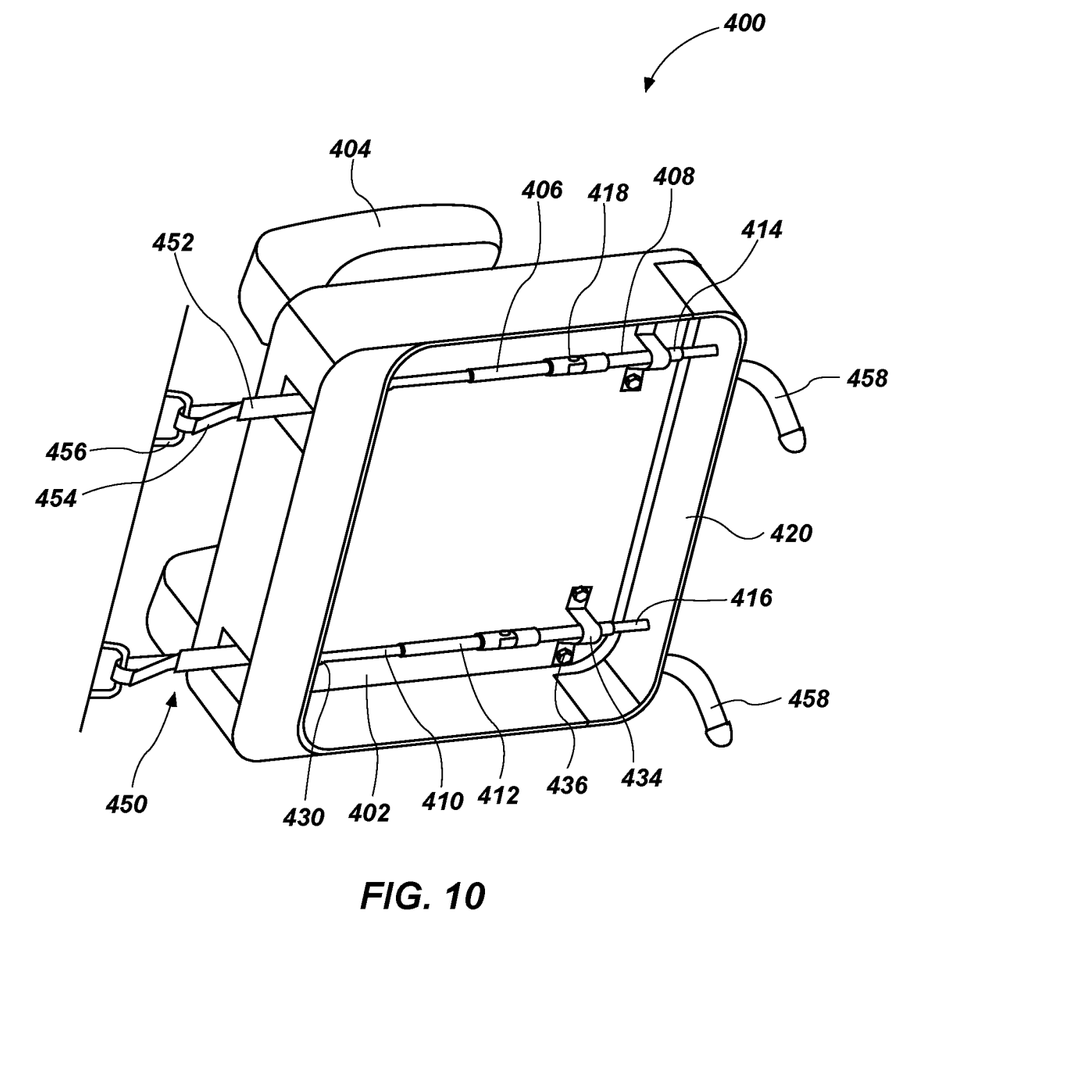
FIG. 10 is a bottom isometric view of the embodiment of FIG. 9.

FIGS. 9-10 further depict another embodiment of a foot rest apparatus 400 having a base 402 that may form part of a child booster seat 404. As described in detail above, foot rest apparatus 400 may include a pair of first arms 406, each having an outer arm member 412 and an inner arm member 410, as well as a pair of second support arms 408, each having a lock arm 414 and an extending arm 416. A hinge 418 may be disposed between first and second support arms 406, 408, and a platform 420 may be disposed at a distal end of second support arms 408. First and second support arms 406, 408 may be attached to the base 402 of the booster seat 404 with attachment portions 430, attachment fasteners (not shown), hanging support members 434 and hanging support fasteners 436, as similarly described with reference to foot rest apparatus 200, above.

Foot rest apparatus 400 may further include a pair of anchor straps 450 for securing the base 402 of the booster seat 404 to the seat on which the booster seat 404 is placed. Each anchor strap 450 may include a first strap member 452 and a clip member 454, which is configured to connect to an anchor 456. An adjustment strap member 458 may connect to and provide for tightening of the anchor straps 450 as is known in the art. Anchor straps 450 may prevent foot rest apparatus 400 from moving out of position if an imbalance of weight is applied between base 402 and platform 420. For example, if a user applies more weight to platform 420 than to base 402, anchor straps 450 prevent foot rest apparatus 400 from being displaced from its position. Alternatives to anchor straps 450 may be employed to secure foot rest apparatus 400, such as alternative anchoring mechanism, or other weight balancing structures.

Figure 11:
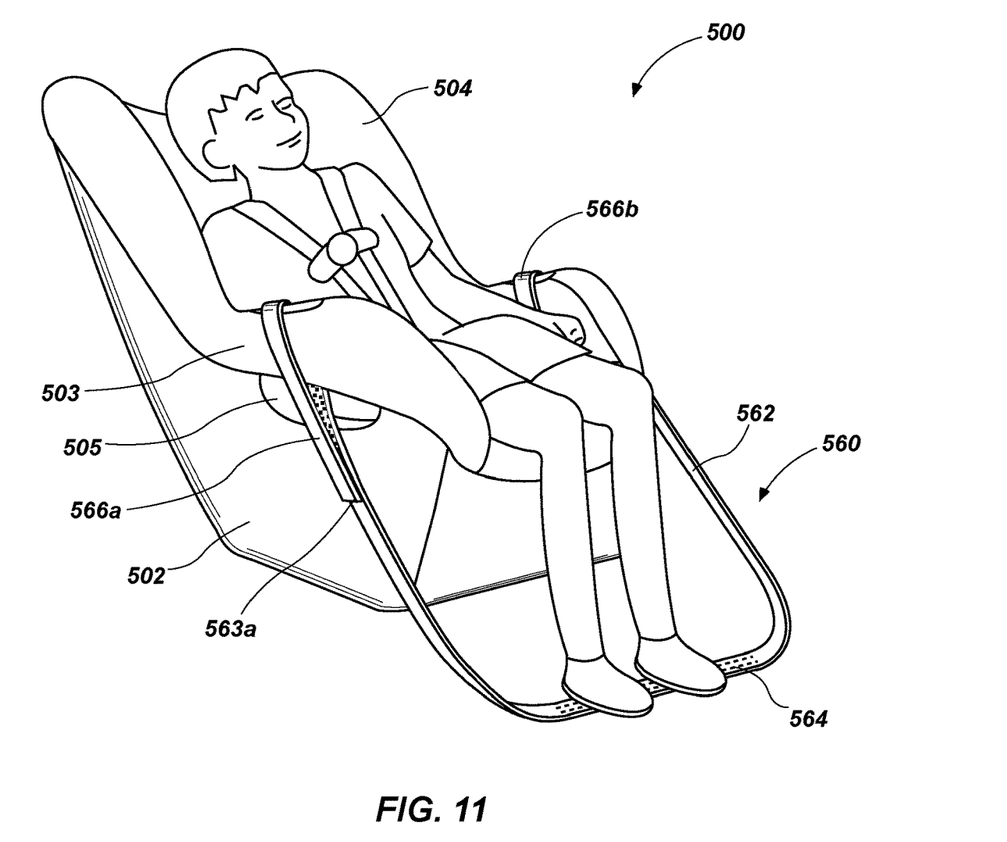
FIG. 11 is a perspective view of another embodiment according to the present invention; and, FIG. 12 is a perspective view of another embodiment according to the present invention which can be added to an existing child seat.

With reference now to FIG. 11, an alternative apparatus for supporting the legs of a seated user is disclosed. An add-on footrest 500 may be used with a seat having a base 502, which may be part of a child car seat 504. The car seat 504 may further include arm rests 503 and armrest openings 505. A foot support 560 may attach to car seat 504 to provide support for the legs of a seated user. Foot support 560 may include a support member 562 extending from a first end 563a to a second end (not shown). The foot support 560 may include a foot rest portion 564 disposed near the center of the support member 562. A first attachment portion 566a may be disposed at the first end 563a of the support member 562, while a second attachment portion 566b may similarly be disposed at the second end of the support member 562.

Each of the first and second attachment portions 566a, 566b may be configured and dimensioned to adjustably attach the support member 562 to the seat 504. For example, support member 562 may attach to arm rests 503 through armrest openings 505. First and second attachment portions 566a, 566b may each comprise an exemplary hook and loop fastener.

The hook portion of the fastener may be disposed on a first length of each of the first and second attachment portions 566a, 566b. For example, the first length of the first attachment portion 566a may be disposed nearest the first end 563a of the support member 562. Furthermore, the loop portion of the fastener may be disposed on a second length of each of the first and second attachment portions 566a, 566b. For example, the second length of the first attachment portion may be disposed closer to the center or foot rest portion 564 of the support member 562 than the first length of the first attachment portion 566a. Accordingly, the hook and loop fastener may provide for the adjustable attachment of each end of the foot support 560, such that the foot support 560 may be added-on, or used to retrofit, existing seats.

Figure 12:
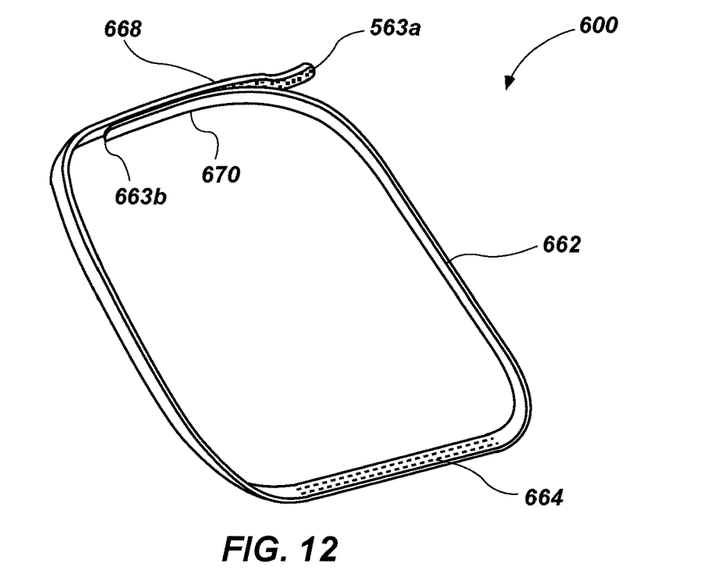

Alternatively, as shown in FIG. 12, a foot support 660 may include a support member 662 extending between a first end 663a and a second end 663b, with a foot rest portion 664 disposed at or near the middle of the support member 662. A first attachment portion 668 may be disposed at or near the first end 663a, and may comprise a hook portion of a hook and loop fastener. A second attachment portion 670 may be disposed at or near the second end 663b, and may comprise a loop portion of the hook and loop fastener. Accordingly, the first attachment portion may be adjustably secured to the second attachment portion, thereby providing adjustment of the height of the foot rest portion 664 relative to the seat on which a user is sitting. In one illustrative embodiment, the first and second attachment portions 668, 670 may be disposed on the seat, for example under a user. The attachment portions of foot support 660 may extend through armrest holes, or otherwise be disposed in cooperation with the seat to provide for a support of the legs.

As described herein, FIGS. 11 and 12 depict a foot rest for adding leg support to a child seat, the foot rest including a first attachment portion, a second attachment portion, a support member extending from the first attachment portion to the second attachment portion, and a foot support disposed on the support member.

In the foregoing Detailed Description, various features of the present disclosure are grouped together in single embodiments for the purpose of streamlining the disclosure. This method of disclosure is not to be interpreted as reflecting an intention that the claimed disclosure requires more features than are expressly recited in each claim. Rather, as the following claims or numbered paragraphs reflect, inventive aspects lie in less than all features of a single foregoing disclosed embodiment. Thus, the following claims or numbered paragraphs are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for supporting the legs of a seated user, the apparatus comprising:
    a base;
    a pair of first support arms attached to a base and extending outwardly from the base;
    a pair of second support arms extending from a distal end of the pair of first support arms;
    a hinge disposed between each of the first and second support arms;
    a platform disposed at a distal end of the second support arms;
    wherein each of the first pair of support arms is attached to the base at least partly by a hanging support member, and
    wherein the hanging support member comprises a U-shaped bracket, with hanging support fasteners connecting either side of the U-shape to the base.

2. The apparatus of claim 1, wherein each of the first support arms comprises at least one outer arm member and at least one inner arm member, the inner arm member configured and dimensioned to be disposed within the outer arm member with the platform is in a stored position.

3. The apparatus of claim 2, wherein the inner and outer arm members are cylindrical.

4. The apparatus of claim 2, wherein the first set of support arms includes an attachment portion which is a flattened portion of the inner arm member.

5. The apparatus of claim 4, wherein the attachment portion is secured to the base by an attachment fastener.

6. The apparatus of claim 1, wherein the platform is retractable from an extended position to a stored position.

7. The apparatus of claim 6, wherein the platform forms part of the base in a stored position.

8. The apparatus of claim 6, wherein the base comprises a closure mechanism to retainer the platform in a stored position.

9. The apparatus of claim 8, wherein the closure mechanism further comprises a button on the side of the base.

10. The apparatus of claim 1, wherein each of the second support arms has an adjustable length.

11. The apparatus of claim 1, wherein each of the second support arms comprise a lock arm and an extending arm.

12. The apparatus of claim 11, wherein the lock arm comprises a lock button, and wherein the extending arm comprises a plurality of lock stops.

13. The apparatus of claim 1, wherein the base is a portion of one of a child car seat, a booster seat or a high chair.

14. The apparatus of claim 1, wherein the pair of first support arms further comprise a set of first slide arms.

15. The apparatus of claim 14, wherein each of the first slide arms further comprises:
    a mounting bracket;
    a first slide bracket;
    a second slide bracket; and
    wherein the first slide brackets are at least partly attached to the base by one or more slide bracket fasteners.

16. A child seat with a base and an integral foot rest comprising:
    at least one retractable support arm;
    a foot rest disposed on a distal end of the at least one retractable support arm;
    the foot rest and the retractable support arm configured and dimensioned to reside within the child seat in a stowed position, and to support the legs of a user in an extended position;
    wherein the at least one retractable support arm is attached to the child seat at least partly by a hanging support member,
    wherein the hanging support member comprises a U-shaped bracket, with hanging support fasteners connecting either side of the U-shape to the child seat; and
    wherein the at least one retractable support arm comprises:
    one or more first support arms attached to the child seat and extending outwardly from the base;
    one or more second support arms extending from a distal end of the pair of first support arms; and
    a hinge disposed between each of the first and second support arms.

17. The apparatus of claim 16, wherein each of the first support arms comprises at least one outer arm member and at least one inner arm member, the inner arm member configured and dimensioned to be disposed within the outer arm member when the footrest is in a stored position.

18. The apparatus of claim 17, wherein the inner and outer arm members are cylindrical.

19. The apparatus of claim 16, wherein each of the second support arms has an adjustable length.

20. The apparatus of claim 16, wherein each of the second support arms comprise a lock arm and an extending arm.

21. The apparatus of claim 20, wherein each of the second support arms comprise a lock arm and an extending arm.

* * * * *